United States Patent [19]

Pearce

[11] 4,186,944
[45] Feb. 5, 1980

[54] SECURITY DOCUMENT

[75] Inventor: Ralph R. Pearce, West Drayton, England

[73] Assignee: EMI Limited, Hayes, England

[21] Appl. No.: 901,229

[22] Filed: Apr. 28, 1978

Related U.S. Application Data

[60] Continuation of Ser. No. 728,058, Sep. 30, 1976, abandoned, which is a division of Ser. No. 568,530, Apr. 16, 1975, Pat. No. 3,998,160.

[30] Foreign Application Priority Data

Apr. 17, 1974 [GB] United Kingdom ............... 16699/74

[51] Int. Cl.² ............................................ B42D 15/00
[52] U.S. Cl. ...................................... 283/8 R; 283/58
[58] Field of Search ................... 283/8, 9, 58; 360/56

[56] References Cited

U.S. PATENT DOCUMENTS

| 3,245,534 | 4/1966 | Smith et al. | 283/8 R |
| 3,280,974 | 10/1966 | Riddle et al. | 283/8 R |
| 3,878,367 | 4/1975 | Fayling et al. | 360/131 |

FOREIGN PATENT DOCUMENTS

| 2124033 | 12/1971 | Fed. Rep. of Germany | 360/56 |
| 1183479 | 3/1970 | United Kingdom . | |
| 1331604 | 9/1973 | United Kingdom . | |

Primary Examiner—John McQuade
Attorney, Agent, or Firm—Fleit & Jacobson

[57] ABSTRACT

A method of printing wherein magnetic particles dispersed in an ink are selectively orientated prior to printing onto a document where the particles are aligned on a carrier while the ink is in a low viscous state and the printing is effected when the ink is in a high viscous state. The method by which the viscosity is changed is the selective application of heat.

6 Claims, 4 Drawing Figures

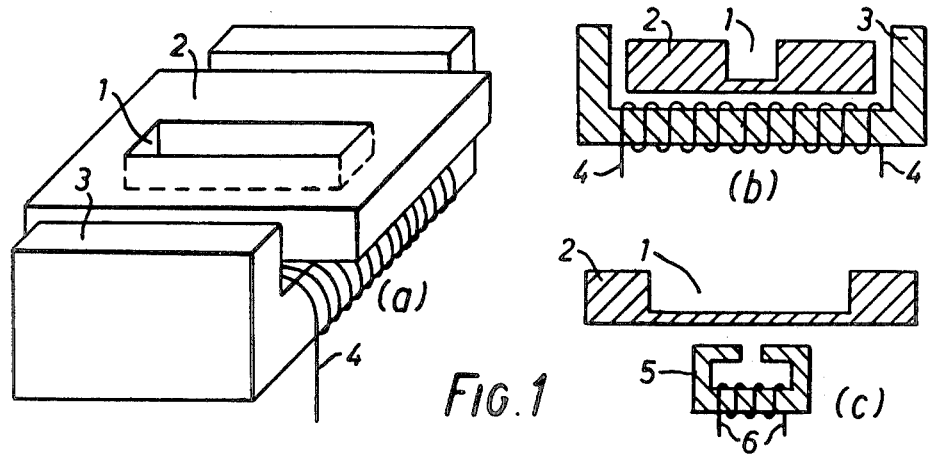
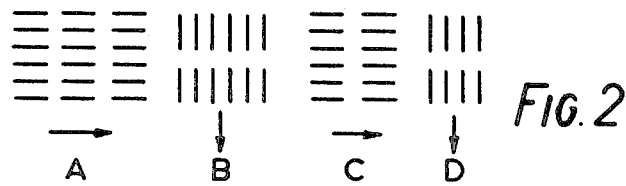
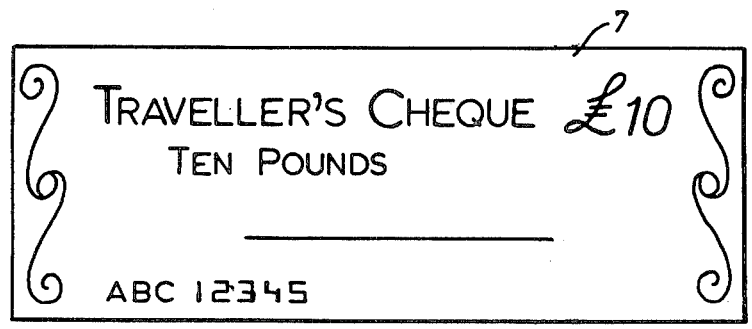
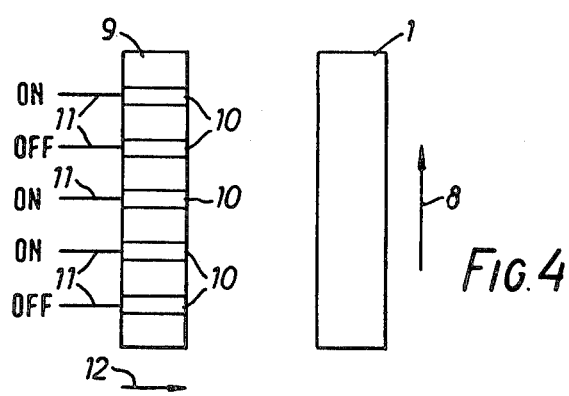

SECURITY DOCUMENT

This is a continuation of application Ser. No. 728,058, filed Sept. 30, 1976 now abandoned, which is a divisional of application Ser. No. 568,530, filed Apr. 16, 1975, now U.S. Pat. No. 3,998,160.

The present invention relates to printing and is especially related to printing involving the use of inks containing magnetic particles.

Our British Pat. No. 1,331,604 relates to the recording of information, especially security information, onto cards having magnetic layers thereon. These cards, which may be security or credit cards, are given a "magnetic watermark" by orientating preselected areas of a coating consisting of magnetic particles in a binder, while the coating is in a liquid state and then causing the coating to solidify. A similar process can also be applied to documents, bank notes, cheques or similar items.

The magnetic watermark patterns cannot be erased by magnetic means since they comprise physically structured differences in the magnetic layers which remain even after demagnetization. They are read in verifying equipment which includes a strong permanent magnet. This magnet is strong enough to saturate the magnetic layers, thus destroying any conventionally recorded magnetic patterns thereon, which may be forgeries. However, the saturation of the layers also develops a remanence pattern which represents any differences in remanence between regions of different orientation. This remanence pattern is sensed by a magnetic read head.

The magnetic watermark may be carried in a coating representing any suitable design including, for example, digits, characters or artistic designs, printed on cheques or bank notes. The magnetic ink may consist of acicular magnetic particles, such as magnetite, $\gamma Fe_2O_3$, $CrO_2$ or similar material dispersed in a vehicle comprising binders, plasticisers etc.

When inks such as these are applied, by a printing process, to fibrous, absorbent surfaces such as common paper or card various problems arise. The most important of these are:

(1) The acicular particles become lodged in the fibrous structure of the support (i.e. paper or card) and their mobility is greatly reduced thus hindering alignment of the magnetic particles; and (2) The rapid leaching of the solvents from the ink by absorption into the support further decreases the ability of the particles to respond to the applied orientation magnetic field. These factors restrict the above mentioned process to applications involving paper or cards having a "highly finished" surface, wherein the nature of the paper allows substantially full orientation of the acicular particles in a magnetic field.

It is an object of the present invention to reduce the effects of the aforementioned problems.

According to the invention there is provided a method of printing on a surface with an ink including acicular magnetic particles so that the authenticity of the printing can be verified, wherein a pattern is formed on a carrier with the ink in the wet state, the particles are subjected to a magnetic aligning process while the ink is on the carrier and the wet ink is transferred to said surface, and the transfer thus being affected with the particles already substantially aligned.

In British Pat. No. 1,183,479 to Pollock a method is disclosed of orientating magnetic particles in a liquid prior to the deposition of said liquid onto a tape. However, the present invention is distinguished from this in that Pollock applies a magnetic aligning field to the ink before the ink is applied to the carrier whereas in the present invention the aligning field is not applied to the ink until after the ink has been applied to the carrier.

In order that the invention may be clearly understood and readily carried into effect embodiments will now be described by way of example only, with reference to the accompanying drawings of which:

FIG. 1 (a), (b) and (c) shows a simple arrangement according to the invention in perspective and cross-sectional views respectively, FIG. 2 shows one example of a printed design, FIG. 3 shows document carrying a portion printed according to the invention, and FIG. 4 shows a different arrangement for effecting one aspect of the invention.

Since the magnetic particles are aligned in the ink prior to printing there are problems relating to the ink to be considered. These problems primarily arise because of the separate requirements that need to be satisfied by the ink and are:

(1) the necessity of the ink to allow good alignment of the magnetic particles—this requires a low viscosity for the ink.

(2) The ink has to give a good quality print and this requires a high viscosity ink, and (3) That on release of the platen from the paper the ink is not drawn up into threads which fall back onto the wet layer and disturb the pre-orientation and this requires what is known in the art as a short ink, for use in plate printing by the transfer process where all the ink is transferred from a platen to the paper surface.

Since these requirements are essentially mutually incompatible it is not apparently possible to incorporate them into a single formulation of ink. A method of overcoming these problems used in the present invention is the preheating of the ink to reduce its viscosity to allow the orientation of the magnetic particles whereon on cooling the ink assumes a form acceptable for good printing.

A typical formulation for the ink used in the present invention is:

| | | |
|---|---|---|
| $CrO_2$ | 28% | Magnetic Pigment |
| Coated $CaCO_3$ | 33% | Extender |
| $MgCO_3$ | 4% | Filler |
| Rosin modified phenolic resin in raw linseed oil | 34.5% | Varnish |
| 6% Cobalt Nuosyl | 0.5% | Drier |

Referring now to the drawings FIG. 1 shows a simple arrangement for working the invention. An engraved cell 1 is cut in a non-magnetic platen 2. Suitable dimensions used are 0.5" long, 0.125" broad and 0.01" deep leaving about 0.001" at the bottom. These dimensions are not critical, however, and any cell fo similar dimensions such as used in printing is applicable. The cell is then filled with ink according to the abovementioned formulation, any excess being wiped from the platen, and is heated (by means not shown) to 55° C., this temperature being one to provide a low viscosity for the ink at the same time as being below the Curie Point for chromium dioxide and additionally not affecting the chemical nature of the ink in an adverse manner. The heated ink and platen is then placed in a magnetic field provided by an electromagnet 3 fed from a source (not shown) throuh winding leads 4. This magnet field is arranged to orientate substantially all the magnetic particles to lie along the breadth of the cell. Theoretical considerations show that complete alignment of the magnetic particles in the direction of the applied field is not possible. However, to achieve optimum alignment a field of 3K gauss is applied by the electromagnet 3 reduced to 2K gauss to prevent overheating of the electromagnet. This field is applied in the order of twenty seconds to allow optimum alignment to occur. The field is removed and a second magnet 5 is passed slowly along the length of the cell 1. The magnetic field of this magnet is controlled through winding leads 6 by means not shown and is arranged to be on or off. In the on situation a field of some 1.5K gauss is generated in the gap of the magnet 5 and this field causes alignment of particles along the length of the cell.

FIG. 2 shows an arrangement of bars which represents a number, character or other design. The blocks of bars ABCD are engraved in the plate and as in the above procedure the alignment of magnetic particles is achieved in each block in the direction shown by the arrows. An improved method of aligning the particles for an example such as is shown in FIG. 2 will be described later with reference to FIG. 4.

The output signal derived from th verifying equipment after D.C. saturation depends upon the remanence of the element, which is related to the depth of the engraving and the direction of the orientation. Blocks A and C, in FIG. 2, have maximum remanence, due to orientation, in the left-right direction while the blocks B and D would have a minimum in that direction. The converse is the case for the up-down direction.

FIG. 3 shows a document 7, with a selected portion printed according to the invention. The "magnetic watermark" can conveniently be printed so that it is optically indistinguishable from the rest of the design. In this example, for instance, the downstroke of the "T" in "TRAVELLER'S" comprises a magnetic watermark but it is not visibly distinct from the other letters in the writing.

In large scale printing operations where a few hundred or more documents need to be printed the apparatus as described with reference to FIG. 1 is not convenient and different systems have to be used. In these processes large platens with a number of cells and/or a pattern engraved on the suface are used as also could be rollers and other similar printing techniques. In these the ink can be either pre-heated before application to the platen or the platen itself can be heated (as is done now in printing in certain circumstances), the application of the ink to the paper providing enough cooling for the ink to return to its unheated high viscosity state.

In length of time required to align the particles in the magnetic field is an important factor and an example of an improved method of alignment is shown in FIG. 4. The magnetic particles in an ink in a cell 1 as before are aligned by a first magnetic field (not shown) to lie substantially in the direction given by the arrow 8. A multi-track recording head 9 is then passed slowly beneath the cell 1 in the direction of the arrow 12. In practise this head 9 would include 40 separate recording heads 10 but only five have been shown for the sake of clarity. Each of these recording heads 10 is then fed by D. C. signals through lead 11 and these D.C. signals can be such as to energise the head 10 or to leave it in the off position. In the figure the heads are respectively ON, OFF, ON, ON, OFF from the top downwards. When this head is passed is passed slowly behind the cell 1 then those magnetic particles lying above the ON recording heads will be aligned in the direction of the arrow 12 the other particles being unchanged. The sizes of fields used are similar to those given for magnet 5 above and a passage time of twenty seconds is needed for optimum alignment. Apart from providing a faster method of orientation than that of FIG. 1 there is the additional advantage that the transition regions between different alignments of particles (i.e. left-right or up-down) are much sharper. This is important in allowing for carrier verification. The multitrack head can, of course, being placed beneath the cell and the fields merely switched on and off without movement.

Although the above invention has been described with respect to a specific formulation of ink there are many similar formulations well known in the art. The magnetic pigment, in this case chromium dioxide, could equally be magnetite or similar material. Improvements can be made by using longer particles than chromium dioxide, which is about 0.5 microns long, to get a greater magnetic moment and particles of the order of 2-3 microns are particularly useful. The magnetization can be further improved by using metal particles such as iron filings of the correct dimensions i.e. acicular. In all examples, however, the aligning fields need to be at least twice the coercive force of the magnetic particles.

Similarly changes in viscosity of the ink have been achieved by heat methods, other methods which can be employed include thixotropy, (well known in non-drip paints), and methods using solvent evaporation, at present used in the production of magnetic tape coatings.

What I claim is:

1. A security document including a carrieer of a materrial having an ink permeable surface and having printed thereon a design delineated by the form of a security ink deposit so that the authenticity of the document can be verified, wherein at least a portion of said document design is printed with a security ink including alignable magnetisable particles said alignable magnetisable particles in at least one selected area of said design being printed in position on said ink permeable surface so that they are substantially aligned in a preselected distinct direction, the distinct direction being detectable to verify the document as authentic.

2. A document according to claim 1 wherein the ink used to print said at least a portion of said design is visually indistingishable from ink used to print the rest of the design.

3. A security document according to claim 1 in which a plurality of distinctly aligned areas of said design are selected and the distinct directions of alignment of particles in these areas form a pattern.

4. A security document according to claim 3 in which a plurality of such distinctly aligned areas are arranged to represent whooly one of a number, a character or other design features.

5. A security document including a carrier of a material having an ink permeable surface and having printed thereon a design delineated by the form of a security ink deposit so that the authenticity of the document can be verified, wherein at least a portion of said document design is printed with a security ink including alignable magnetisable particles, an extender, a filler, a varnish and a drier agent, proportioned to produce a visocity controllably changeable from a condition in which the particles are alignable to a condition in which the alignments are maintained, there being substantially equal proportions of the extender, of the varnish and of the magnetisable particles and filler taken together, and a minor proportion of the drier agent, and said alignable magnetisable particles in at least one selected area of said design being printed in position on said ink permeable surface so that they are substantially aligned in a preselected distinct direction, the distinct direction being detectable to verify the document as authentic.

6. A security document according to claim 5 wherein the proportion of the drier agent is 0.5%.

* * * * *